July 2, 1940.  A. KOINZAN  2,206,358
OIL PURIFIER
Filed June 8, 1939
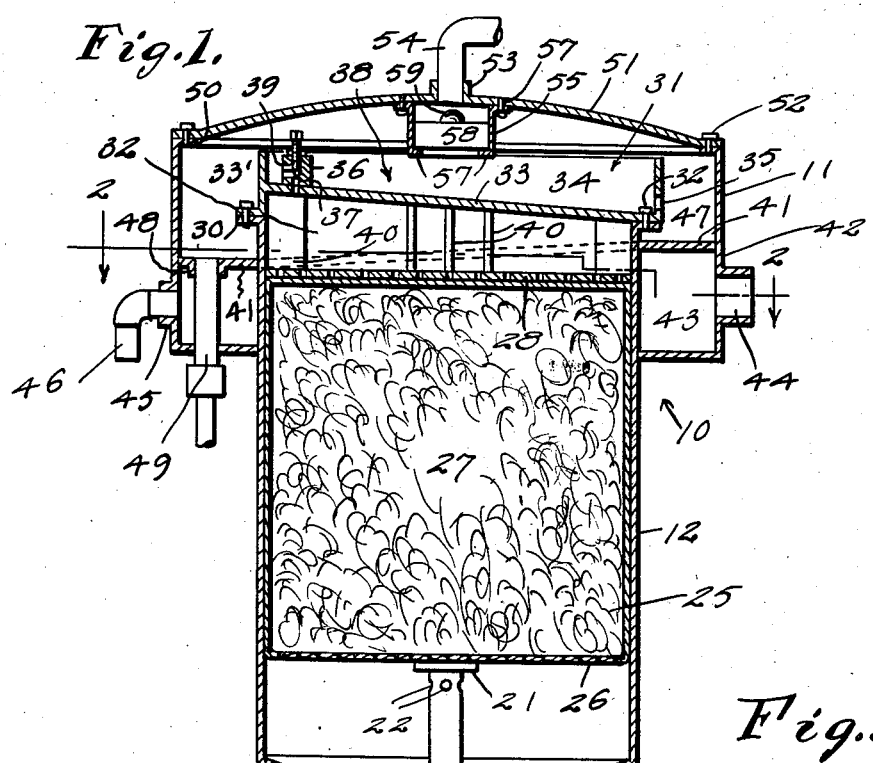
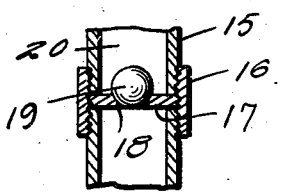
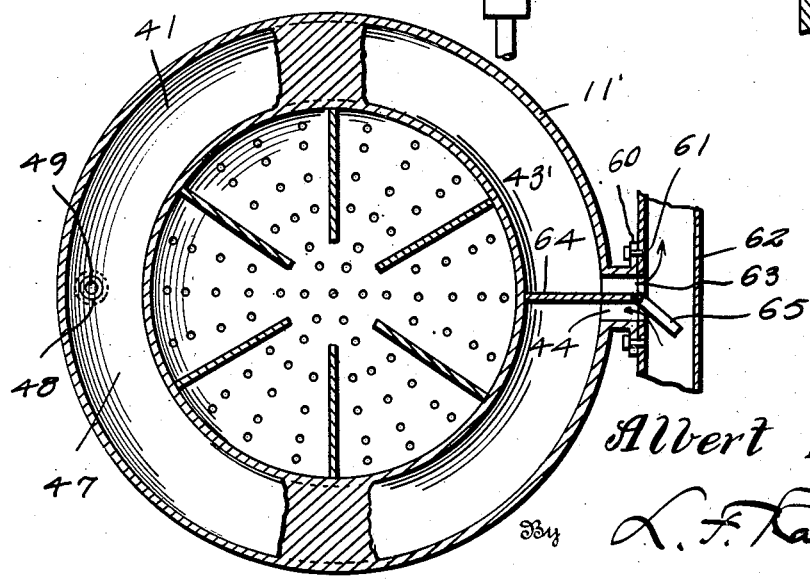
Inventor
Albert Koinzan
By L. F. Randolph
Attorney Patented July 2, 1940

2,206,358

UNITED STATES PATENT OFFICE 2,206,358

OIL PURIFIER

Albert Koinzan, Elgin, Nebr.

Application June 8, 1939, Serial No. 278,149

6 Claims. (Cl. 210—122.5)

This invention relates to an improved attachment for use with internal combustion engines for cleansing and purifying the crank-case oil and is particularly designed for engines having a pressure oil supplying system.

More particularly, it is an object of this invention to provide an oil purifier including means for supplying oil under pressure to a casing containing a filter body through which the oil is initially directed and whereby the sludge and other foreign particles carried by the oil are separated; and means for heating the filtered oil during and after the final stages of its filtration so that the liquid diluents are distilled from the oil and released by means of a vent, in the form of vapors, from the top of said casing, after which the purified oil is returned to the engine.

Still a further aim of the invention is to provide improved means for utilizing the exhaust gases of internal combustion engines for heating the oil during and after the filtration and up until the time that it passes out of the purifier so that all of the liquid diluents as well as foreign particles will be removed from the oil before it is returned to the engine.

Still another object of the invention is to provide an improved and simplified form of purifier through which the oil to be purified and cleaned enters through the bottom thereof and is directed upwardly under pressure so that foreign particles are removed and allowed to settle in the bottom of the purifier, from whence they can be readily drained, after which the liquid diluents are distilled and released from the purifier through the top thereof.

Other objects and advantages of the invention will hereinafter become more fully apparent from the following description of the drawing, which illustrates a preferred embodiment thereof, and wherein—

Figure 1 is a vertical central sectional view partly in elevation of the oil purifier.

Figure 2 is a view taken substantially on the plane of line 2—2 of Figure 1 and illustrating a slightly modified form of the invention, and Figure 3 is an enlarged vertical sectional view taken along the line 3—3 of Figure 1.

Referring more particularly to the drawing, wherein like reference characters designate like or corresponding parts throughout the different views, the preferred form of the invention, as seen in Figure 1, includes a casing designated generally 10 having an enlarged head 11 and a reduced depending portion 12, the upper end of which extends into the head 11. Casing 10, as illustrated, is cylindrical in cross section but may be made in any other desired shape.

Portion 12 is provided with a cone shaped bottom 13 having a flanged opening 14 through which extends a pipe 15 which is adapted to connect with a pressure oil feeding system, not shown, of an internal combustion engine. Pipe 15 is provided with a coupling 16 which is internally threaded to connect two sections forming a part of the pipe 15, as best seen in Figure 3, and which is provided with a partition 17 disposed between said sections and having a tapered opening 18 connecting the sections. Tapered opening 18 forms a seat for a ball valve 19 mounted above the partition 17 and adapted to open under pressure from beneath to admit oil to the casing 10 but to prevent the oil from returning through pipe 15. A rod 20 extends through pipe 15 above and spaced from the ball valve 19 to form a cage to limit the extent to which the valve 19 can move from its seat 18. The upper end of pipe 15 is closed by means of an enlarged disk or cap 21 and beneath this cap pipe 15 is provided with a series of spaced openings or outlet ports 22 by means of which the oil is adapted to be discharged radially into the lower part of portion 12.

Bottom 13 is also provided with a drain opening 23 which is threaded to receive the removable threaded plug 24, for a purpose which will hereinafter be described.

A filter, designated generally 25, is mounted in the depending portion 12 and with its bottom resting on cap 21 and is of sufficient size to fit tight within the portion 12, as illustrated in Figure 1. Filter 25 comprises a porous fabric bag 26 containing a filler 27 of cotton or the like.

A perforated disk 28 is removably mounted in the top part of the intermediate portion 12 and rests on the top of the filter 25. The open top 29 of portion 12 which extends into the head 11, is provided with a flange 30 forming a seat for the removable cover, designated generally 31, which is partially flanged at 32 and which is sized and shaped to fit the flange 30 and to be removably secured thereto by means of a plurality of fastenings 33', certain of which extend through its flange 32 and others of which extend through its bottom 33. Cover 31 is provided with an upset marginal flange 34 which forms with the bottom 33 an open top container, for a purpose which will hereinafter be described. As seen in Figure 1, the upper free edge of the flange 34 is substantially level while the bottom 33 slopes from the left to the right and adjacent its low side flange 34 is provided with an opening 35. Bottom 33, adjacent its high side, is provided with an upset enlargement 36 having an angular shape passage 37, the depending end of which opens into the portion 12 and the opposite end of which opens into the container, designated generally 38, which is formed by bottom 33 and flange 34. A valve 39, provided with a threaded stem, is adjustably mounted in a threaded bore in the enlargement 36 for controlling the passage 37. Bottom 33 of the cover 31 is provided with a plurality of depending radially disposed fins 40, the free edges of which rest on the plate 28 to urge it downwardly against the filter member 25 to thereby hold the filter member expanded and in contact with the side walls of the portion 12.

Head 11 is provided with an annular partition 41 disposed between its outer wall 42 and the cylindrical wall of the depending portion 12 which forms the annular chamber 43 having a flanged opening 44 at one side thereof which is adapted to connect with an exhaust conduit, not shown, of an internal combustion engine, and a flanged opening 45 at its opposite side to which is connected the outlet end of the exhaust pipe, designated 46. Chamber 43 surrounds the upper part of the filter member 25 and is adapted to be heated by the exhaust gases passing therethrough.

Partition 41, which is disposed beneath the flange 30, slopes from its high side, which is directly beneath the port 35, to its low side which is at the opposite side of the head 11 to form with the cylindrical side wall 42 an annular trough 47 having a sloping bottom. At its low side, partition 41 is provided with a flanged opening 48 in which is mounted an end of an outlet pipe 49 which extends downwardly through the chamber 43 and which is adapted to be connected at its opposite end with the internal combustion engine, not shown.

At its top, the wall 42 is provided with an inturned marginal flange 50 forming a seat for the top or lid 51 of the casing head 11 which is removably secured to the flange 50 by means of a plurality of fastenings 52. Top 51 is provided with a central flanged opening 53 in which is mounted one end of a pipe 54, the opposite end of which, may if desired, connect with the exhaust pipe 46. Top 51 is provided with a depending cage formed of a plurality of spaced depending arms 55 secured by the fastenings 56, at their upper ends, to the top 51 and having the inturned lower ends 57 forming a seat for a float valve 58 having a nipple 59 to seat in and close pipe 54.

In Figure 2, a slightly modified form of the device is shown wherein flanged opening 45 and the outlet end 46 of the exhaust pipe are dispensed with, and in lieu thereof the flanged opening 44 is provided with the lugs 60 to receive the fastenings 61 to connect the modified head 11' to the exhaust manifold 62 with the flanged port 44' registering with an opening 63 in the manifold 62. A partition 64 divides the annular chamber 43' intermediate of the port 44', said partition extending transversely through port 44' and being provided at its free end with a pivotally mounted baffle member 65 which extends into the exhaust manifold 62 for directing the exhaust gases inwardly through one side of port 44' to the chamber 43' around said chamber and outwardly through the opposite side of port 44', as indicated by the arrows.

From the foregoing it will be seen, that when the internal combustion engine with which the purifier is associated is in operation so that oil is being fed under pressure, the oil will be forced upwardly through pipe 15 and discharged through the openings 22 into the bottom of portion 12 after which the oil will be forced upwardly through the filter 25, to separate the sludge, dirt and metal filings from the oil. These particles will be collected in the bottom 13 from which they can be removed by the drain opening 23. The oil passing upwardly through member 25 will thus be filtered and when it reaches a point adjacent the top of the filter 25 it will be heated by means of the chamber or jacket 43 through which the hot exhaust gases are passing. Chamber 43 will also heat the plate 28 and the ribs or fins 40 which will conduct the heat to the bottom 33. The oil will pass from the filter 25 through the apertures in plate 28 and then upwardly around the fins 40 through the passage 37 from which it will be discharged into the container or basin 38. From container 38 the oil will be dispensed by opening or port 35 into trough 47 having the sloping bottom 41 which will direct it to the outlet pipe 49 to return the oil to the engine. The oil will be heated while passing through the top of filter 25, through plate 28, around fins 40 and while in container 38 and will be heated to even a greater extent while in the trough 47 due to the fact that its bottom 41 also constitutes the top of the chamber 43. This heating of the oil will cause any water, gasoline or other liquid diluents carried by the oil to be vaporized and these vapors will be released from the head 11 or 11', by means of the vent pipe 54. Should the oil entirely fill head 11 or 11' float 58 will be raised thereby to close the vent pipe 54 to prevent the oil from being discharged therefrom.

In the form as shown in Figure 2, the operation of the purifier will be the same except that the exhaust gases will enter and pass out through the port 44' and the extent to which the chamber 43' is heated can be governed by adjusting the baffle 65 which can be controlled either manually or by means of a thermostat, in any conventional manner.

Various modifications and changes are contemplated and may be resorted to and the right is reserved to make such variations as fall within the spirit and scope of the invention as hereinafter defined by the appended claims.

I claim as my invention:

1. An oil purifier for internal combustion engines, comprising a casing containing a filter, a pipe opening into the lower part of said casing beneath said filter for supplying oil under pressure, said casing having an annular chamber surrounding the upper part of said filter and adapted to form a part of the exhaust passage of the engine, a removable cover disposed above said filter and provided with a marginal upset flange, said cover having a valve controlled passage, said casing having an annular trough, sloping from one side thereof to the other, disposed beneath and around the marginal flange of said lid and above said annular chamber, said marginal flange having a port opening at the high side of said trough, an outlet pipe communicating with the bottom of said trough at the low side thereof, and the top of said casing being provided with a vent.

2. A device as in claim 1, comprising a cage depending from the top of said casing, and a float valve mounted in said cage for closing said vent.

3. A device as in claim 1, comprising a perforated plate mounted on the top of said filter, and a plurality of heat conducting fins depending from said cover and having their free edges engaging said plate.

4. An oil purifier attachment for internal combustion engines, comprising a casing having an enlarged head provided with a removable top and a reduced depending portion having one end extending upwardly into said head, a pipe communicating with the bottom of said depending portion for supplying oil under pressure thereto, a filter mounted in said depending portion above said pipe, an annular chamber, formed in said head, and surrounding the upper part of said filter, an annular trough formed in said head above said annular chamber, said trough having a sloping bottom, a removable cover for said depending portion having an upset marginal flange forming a basin having a sloping bottom, a port in said flange opening above the high side of said trough, a valve controlled passage in said cover having one end opening into said basin, a plurality of heat conducting fins depending from said cover, an outlet pipe connecting with the low side of said trough, and a vent formed in said removable top.

5. A device as in claim 4, comprising a valve mounted in said inlet pipe and opening inwardly of said depending portion.

6. A device as in claim 4, comprising an outlet connecting with said annular chamber and adapted to connect with the exhaust manifold of an internal combustion engine, a partition extending transversely through said outlet and through a portion of said annular chamber, and a baffle pivotally connected to said partition and adjustably mounted in said manifold for directing the exhaust gases inwardly through said outlet on one side of said partition and for exhausting the gases through said outlet on the opposite side of the partition.

ALBERT KOINZAN.